(12) United States Patent
Sung

(10) Patent No.: US 11,107,397 B2
(45) Date of Patent: Aug. 31, 2021

(54) DISPLAY DEVICE HAVING A FEEDBACK LOOP FOR A POWER SUPPLY VOLTAGE

(71) Applicant: SAMSUNG DISPLAY CO., LTD., Yongin-si (KR)

(72) Inventor: Siduk Sung, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/564,624

(22) Filed: Sep. 9, 2019

(65) Prior Publication Data

US 2020/0152121 A1 May 14, 2020

(30) Foreign Application Priority Data

Nov. 9, 2018 (KR) .......................... 10-2018-0137525

(51) Int. Cl.
*G09G 3/3225* (2016.01)
*H02M 3/158* (2006.01)
*G09G 3/3275* (2016.01)
*G09G 3/3266* (2016.01)

(52) U.S. Cl.
CPC ......... *G09G 3/3225* (2013.01); *G09G 3/3266* (2013.01); *G09G 3/3275* (2013.01); *H02M 3/158* (2013.01); *G09G 2320/0204* (2013.01); *G09G 2330/02* (2013.01)

(58) Field of Classification Search
None
See application file for complete search history.

(56) References Cited

U.S. PATENT DOCUMENTS

| 2010/0123693 | A1* | 5/2010 | Utsunomiya | ........ G09G 3/3696 345/205 |
| 2011/0242087 | A1* | 10/2011 | Ebisuno | ............... G09G 3/3233 345/212 |
| 2017/0221413 | A1* | 8/2017 | Hoffman | .............. G09G 3/3426 |

FOREIGN PATENT DOCUMENTS

| KR | 10-2008-0040146 | 5/2008 |
| KR | 10-2013-0130327 | 12/2013 |
| KR | 10-2014-0143593 | 12/2014 |
| KR | 10-2016-0049073 | 5/2016 |

* cited by examiner

*Primary Examiner* — Matthew Yeung
(74) *Attorney, Agent, or Firm* — F. Chau & Associates, LLC

(57) ABSTRACT

A display device includes a display panel including pixels, a data driver providing data signals to the pixels, a scan driver providing scan signals to the pixels, a DC-DC converter converting an input voltage to a power supply voltage and supplying the power supply voltage to the display panel, a feedback circuit having a variable impedance and providing a feedback path of the power supply voltage to the DC-DC converter by receiving the power supply voltage supplied from the DC-DC converter to the display panel and providing an error signal corresponding to a difference between the feedback voltage and a reference voltage to the DC-DC converter, and a controller controlling the data driver and the scan driver, calculating a panel load of the display panel based on input image data, and adjusting the variable impedance of the feedback circuit according to the calculated panel load.

7 Claims, 7 Drawing Sheets

DISPLAY DEVICE HAVING A FEEDBACK LOOP FOR A POWER SUPPLY VOLTAGE

CROSS-REFERENCE TO RELATED APPLICATION

This application claims priority under 35 USC § 119 to Korean Patent Application No. 10-2018-0137525, filed on Nov. 9, 2018 in the Korean Intellectual Property Office (KIPO), the content of which is incorporated by reference herein in its entirety.

BACKGROUND

1. Field

The present inventive concept relates to a display device having a feedback loop for power supply voltages, more particularly, to a display device having a DC-DC converter with a feedback loop controlled by a calculated panel load.

2. Description of the Related Art

Display devices include a DC-DC converter for converting an input voltage received from an external power supply, such as a battery, into a power supply voltage suitable for operating a display panel. To maintain a desired voltage level of the power supply voltage, a feedback loop that provides the power supply voltage back to the DC-DC converter may be used. However, in a conventional display device, since this feedback loop is designed suitable for a particular value of a panel load, a transient response of the feedback loop may become worse as the panel load changes. Further, if the panel load is changed, the feedback loop may become unstable, and thus the power supply voltage may diverge.

SUMMARY

Some example embodiments provide a display device having a power supply voltage feedback loop that is stable even if a power supply voltage is changed.

According to an exemplary embodiment of the present inventive concept, a display device includes a display panel including pixels, a data driver providing data signals to the pixels, a scan driver providing scan signals to the pixels, a DC-DC converter converting an input voltage to a power supply voltage, and supplying the power supply voltage to the display panel, a feedback circuit having a variable impedance and providing a feedback path of the power supply voltage to the DC-DC converter by receiving the power supply voltage supplied from the DC-DC converter to the display panel as a feedback voltage of the DC-DC converter, and providing an error signal corresponding to a difference between the feedback voltage and a reference voltage to the DC-DC converter, and a controller controlling the data driver and the scan driver, calculating a panel load of the display panel based on input image data, and adjusting the variable impedance of the feedback circuit according to the calculated panel load.

According to an exemplary embodiment of the present inventive concept, a display device includes a display panel including pixels, a data driver providing data signals to the pixels, a scan driver providing scan signals to the pixels, a DC-DC converter converting an input voltage into a power supply voltage, and supplying the power supply voltage to the display panel, a controller controlling the data driver and the scan driver, calculating a panel load of the display panel based on input image data, and generating an impedance control signal based on the calculated panel load, an error amplifier including a first input terminal receiving the power supply voltage supplied to the display panel as a feedback voltage of the DC-DC converter, a second input terminal receiving a reference voltage, and an output terminal providing an error signal to the DC-DC converter, the error amplifier generating the error signal corresponding to a difference between the feedback voltage and the reference voltage, and an impedance circuit connected to the output terminal of the error amplifier and the first input terminal thereof, and controlled, in response to the impedance control signal, to have a variable impedance.

According to an exemplary embodiment of the present inventive concept, a display device includes a display panel including pixels, a data driver providing data signals to the pixels, a scan driver providing scan signals to the pixels, a DC-DC converter converting an input voltage into a power supply voltage, and supplying the power supply voltage to the display panel, a controller controlling the data driver and the scan driver, calculating a panel load of the display panel based on input image data, and generating an impedance control signal based on the calculated panel load, an error amplifier including a first input terminal receiving the power supply voltage supplied to the display panel as a feedback voltage of the DC-DC converter, a second input terminal receiving a reference voltage, and an output terminal providing an error signal to the DC-DC converter, the error amplifier generating the error signal corresponding to a difference between the feedback voltage and the reference voltage and an impedance circuit connected to the output terminal of the error amplifier and the first input terminal, and including at least one switch that is selectively turned on in response to the impedance control signal, and at least one capacitor that is selectively connected by the at least one switch.

As described above, a display device according to example embodiments may include a feedback circuit that provides a DC-DC converter with an error signal corresponding to a difference between a power supply voltage generated by the DC-DC converter and supplied to a display panel and a reference voltage, may calculate a panel load based on input image data, and may adjust an impedance of the feedback circuit according to the calculated panel load. Accordingly, a transient response characteristic and a stability of a feedback loop for the power supply voltage may be improved, and a voltage drop caused by a ripple of the power supply voltage and a change of the panel load may be reduced.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
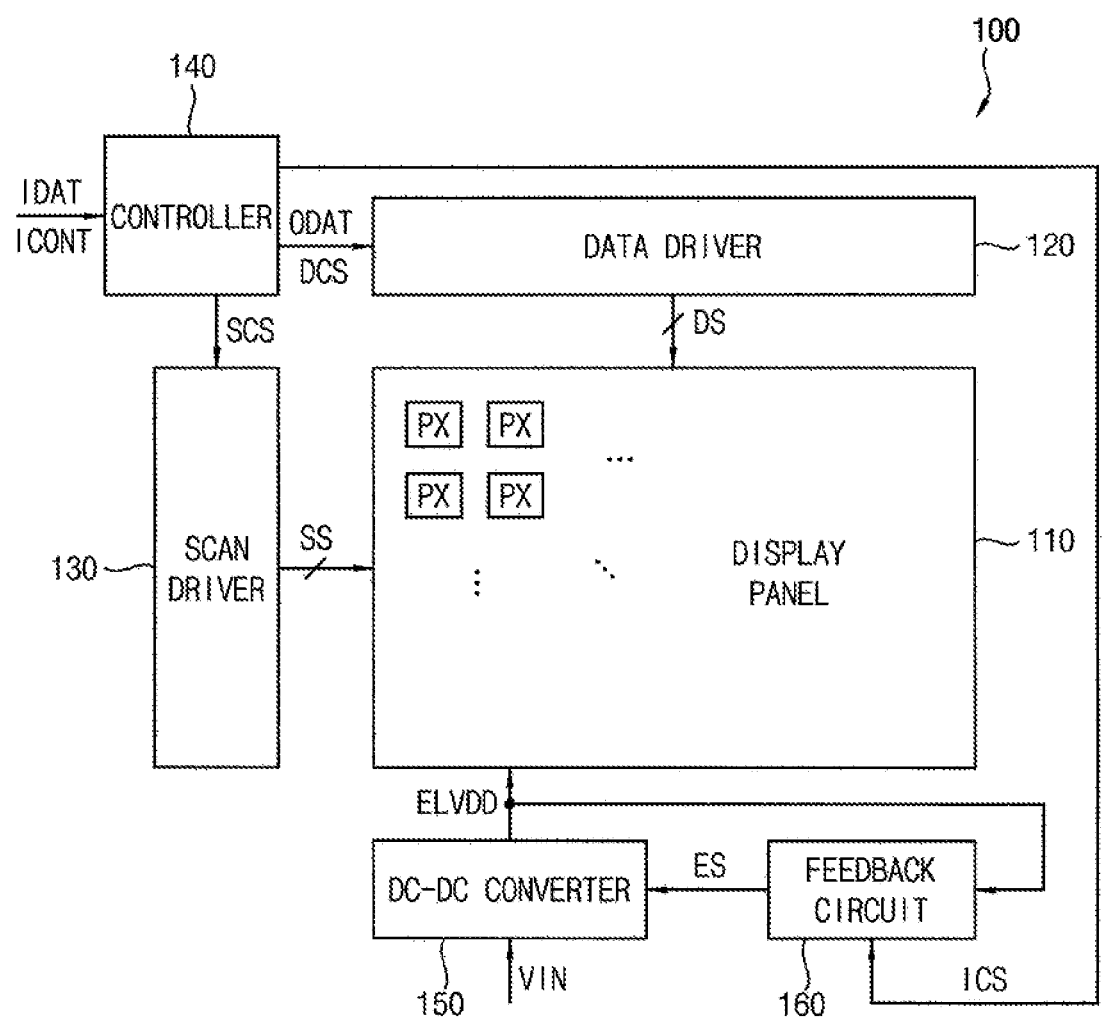
FIG. 1 is a block diagram illustrating a display device according to example embodiments.
Figure 2:
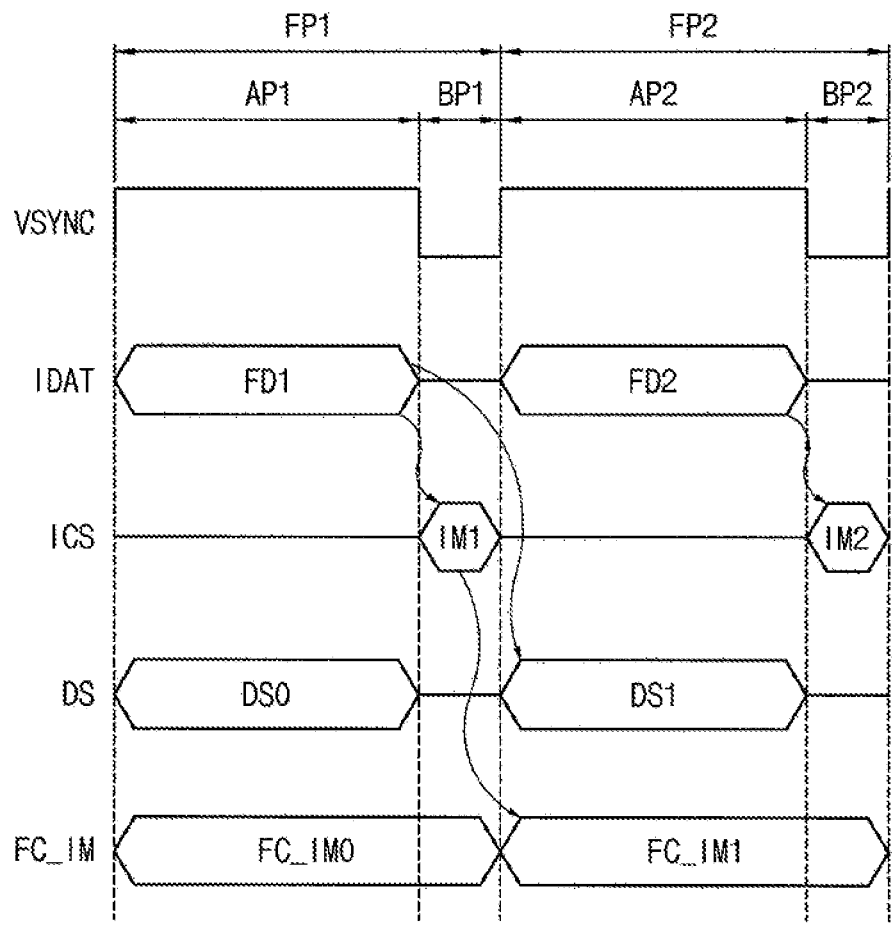
FIG. 2 is a timing diagram for describing an example of an operation of a display device of FIG. 1.

FIG. 1 is a block diagram illustrating a display device according to example embodiments, and FIG. 2 is a timing diagram for describing an example of an operation of the display device of FIG. 1.

Referring to FIG. 1, the display device 100 includes a display panel 110 including a plurality of pixels PX, a data driver 120 that provides data signals DS to the plurality of pixels PX, a scan driver 130 that provides scan signals SS to the plurality of pixels PX, a DC-DC converter 150 that converts an input voltage VIN into a power supply voltage ELVDD, a feedback circuit 160 that provides an error signal ES to the DC-DC converter 150, and a controller (e.g., a timing controller) 140 that controls an operation of the display device 100.

The display panel 110 may include a plurality of data lines, a plurality of scan lines, and the plurality of pixels PX connected to the plurality of data lines and the plurality of scan lines. In some example embodiments, each pixel PX may include an organic light emitting diode OLED, and the display panel 110 may be an OLED display panel. However, the display panel 110 is not limited to the OLED display panel. For example, the display panel 110 may be any display panel.

The data driver 120 provides the data signal DS to the plurality of pixels PX through the plurality of data lines based on a data control signal DCS and output image data ODAT received from the controller 140. In some example embodiments, the data control signal DCS may include, but not be limited to, a horizontal start signal and a load signal.

The scan driver 130 provides the scan signals SS to the plurality of pixels PX through the plurality of scan lines based on a scan control signal SCS received from the controller 140. In some example embodiments, the scan control signal SCS may include, but is not limited to, a start signal and a scan clock signal.

The controller (e.g., the timing controller) 140 receives input image data IDAT and an input control signal ICONT from an external host processor (e.g., a graphic processing unit (GPU) or a graphic card). In some example embodiments, the input image data IDAT may be RGB data including red image data, green image data and blue image data. In some example embodiments, the input control signal ICONT may include, but is not be limited to, a vertical synchronization signal, a horizontal synchronization signal, a master clock signal, a data enable signal, or the like. The controller 140 may control operations of the data driver 120, the scan driver 130, the DC-DC converter 150 and/or the feedback circuit 160 based on the input image data IDAT and the input control signal ICONT.

The DC-DC converter 150 receives the input voltage VIN from an external power supply, such as a battery, converts the input voltage VIN into the power supply voltage (e.g., a high power supply voltage) ELVDD suitable for the display panel 110, and supplies the converted power supply voltage ELVDD to the display panel 110. According to example embodiments, the DC-DC converter 150 may be a buck converter, a boost converter, or the like for converting the input voltage VIN into the power supply voltage ELVDD. In some example embodiments, the DC-DC converter 150 may further generate a low power supply voltage, an analog driving voltage, a gate driving voltage, an initialization voltage, or the like for the display panel 110 based on the input voltage VIN.

The feedback circuit 160 receives the power supply voltage ELVDD supplied to the display panel 110 as a feedback voltage, and provides (i.e., feedbacks) the error signal ES corresponding to a difference between the feedback voltage (i.e., the power supply voltage ELVDD) and a reference voltage back to the DC-DC converter 150. In some example embodiments, the reference voltage may have a voltage level that is desired with respect to the power supply voltage ELVDD. However, the voltage level of the reference voltage is not limited thereto. Accordingly, in the display device 100 according to example embodiments, since the power supply voltage ELVDD output to the display panel 110 is input in a form of the error signal ES through the feedback circuit 160 back to the DC-DC converter 150, a closed feedback loop for the power supply voltage ELVDD may be formed. For example, the DC-DC converter 150 and the feedback circuit 160 may form the closed feedback loop for the power supply voltage ELVDD, in which the DC-DC converter 150 generates the power supply voltage ELVDD and receives the error signal ES as a feedback signal of the power supply voltage ELVDD through the feedback circuit 160. Thus, since the display device 100 has the feedback loop for the power supply voltage ELVDD, the power supply voltage ELVDD may have a desired voltage level. In some example embodiments, the DC-DC converter 150 and the feedback circuit 160 may be implemented as, but is not be limited to, a power management integrated circuit (PMIC).

Even if a conventional display device has a feedback loop for the power supply voltage ELVDD, the feedback loop may be designed suitable for a particular (or single) value of a panel load. However, in a case where the display panel 110 is an OLED display panel, the panel load of the display panel 110 to which the power supply voltage ELVDD is applied may be greatly changed according to whether the plurality of pixels PX emit light. For example, depending of the number of the plurality of pixels PX that emit light, the panel load may be greatly change and thus the DC-DC converter 150 may be required to have fast response time and low output ripples, for example. Accordingly, in the conventional display device having the feedback loop designed suitable for the particular value of the panel load, a transient response of the feedback loop may become worse as the panel load changes. Further, if the panel load is changed, the feedback loop may become unstable, and thus the power supply voltage ELVDD)) may diverge.

However, in the display device 100 according to example embodiments, the controller 140 calculates the panel load of the display panel 110 based on the input image data IDAT, and generates an impedance control signal ICS based on the calculated panel load. The impedance of the feedback circuit 160 may be set according to the impedance control signal ICS representing the calculated panel load. For example, the controller 140 may calculate the panel load by calculating a sum or an average of the input image data IDAT.

The impedance of the feedback circuit 160 may be changed according to the calculated panel load in response to the impedance control signal ICS received from the controller 140. For example, the impedance control signal ICS may have a plurality of bits. The feedback circuit 160 may include a plurality of switches each of which is controlled by a corresponding one of the plurality of bits, and each of which, in response to the corresponding one of the plurality of bits, selectively connects a corresponding one of a plurality of passive elements (e.g., resistors and/or capacitors) to the feedback loop for the power supply voltage ELVDD. With the plurality of passive elements that are selectively connected to the feedback loop for the power supply voltage ELVDD in response to the impedance control signal ICS, the impedance of the feedback circuit 160 may be changed.

In some example embodiments, the feedback circuit 160 (or an impedance circuit included in the feedback circuit 160) may include at least one switch that is selectively turned on in response to the impedance control signal ICS, and at least one resistor that is selectively connected by the at least one switch. Accordingly, with the at least one resistor that is selectively connected to the feedback loop for the power supply voltage ELVDD in response to the impedance control signal ICS, the impedance, or a resistance of the feedback circuit 160 may be changed.

In other example embodiments, the feedback circuit 160 (or the impedance circuit) may include at least one switch that is selectively turned on in response to the impedance control signal ICS, and at least one capacitor that is selectively connected by the at least one switch. Accordingly, by the at least one capacitor that is selectively connected to the feedback loop for the power supply voltage ELVDD in response to the impedance control signal ICS, the impedance, or a capacitance of the feedback circuit 160 may be changed.

In still other example embodiments, by the at least one resistor and the at least one capacitor that are selectively connected to the feedback loop for the power supply voltage ELVDD in response to the impedance control signal ICS, the resistance and the capacitance of the feedback circuit 160 may be changed.

For example, as illustrated in FIG. 2, in an active period AP1 of a first frame FP1, the controller 140 may receive first frame data FD1 as the input image data IDAT from the external host processor, and may calculate the panel load of the display panel 110 corresponding to the first frame data FD1. In the active period AP1 of the first frame FP1, the data driver 120 may provide data signals DS0 corresponding to previous frame data to the plurality of pixels PX, and the impedance FC_IM of the feedback circuit 160 may be an impedance FC_IM0 set according to the calculated panel load of the previous frame data. In a blank period BP1 of the first frame FP1, the controller 140 may provide the impedance control signal ICS corresponding to a first impedance IM1 to the feedback circuit 160. The first impedance IM1 represents a calculated panel load of the first frame data FD1.

In an active period AP2 of a second frame FP2, the data driver 120 may provide data signals DS1I corresponding to the first frame data FD1 to the plurality of pixels PX, and thus the display panel 110 may have the panel load corresponding to the first frame data FD1. Further, in the active period AP2 of the second frame FP2, the feedback circuit 160 may have an impedance FC_IM1 set according to the calculated panel load of the first frame data FD1) based on the impedance control signal ICS representing the first impedance IM1. Accordingly, although the panel load is changed corresponding to the first frame data FD1, the impedance FC_IM of the feedback circuit 160 may be changed according to the changed panel load. Accordingly, a transient response characteristic and a stability of the feedback loop for the power supply voltage ELVDD may be improved, and a voltage drop caused by a ripple of the power supply voltage ELVDD and the change of the panel load may be reduced. For example, since the DC-DC converter 150 is controlled with a calculated panel loading of image data to be displayed, it may have a stable transient operation with fast transient response time and low output ripples. The controller 140 may calculate the panel load of the display panel 110 corresponding to second frame data FD2 in the active period AP2 of the second frame FP2, and may provide the impedance control signal ICS representing a second impedance IM2 to the feedback circuit 160 in a blank period BP2 of the second frame FP2. The second impedance IM2 corresponds to a calculated panel load of the second frame data FD2.

Figure 3:
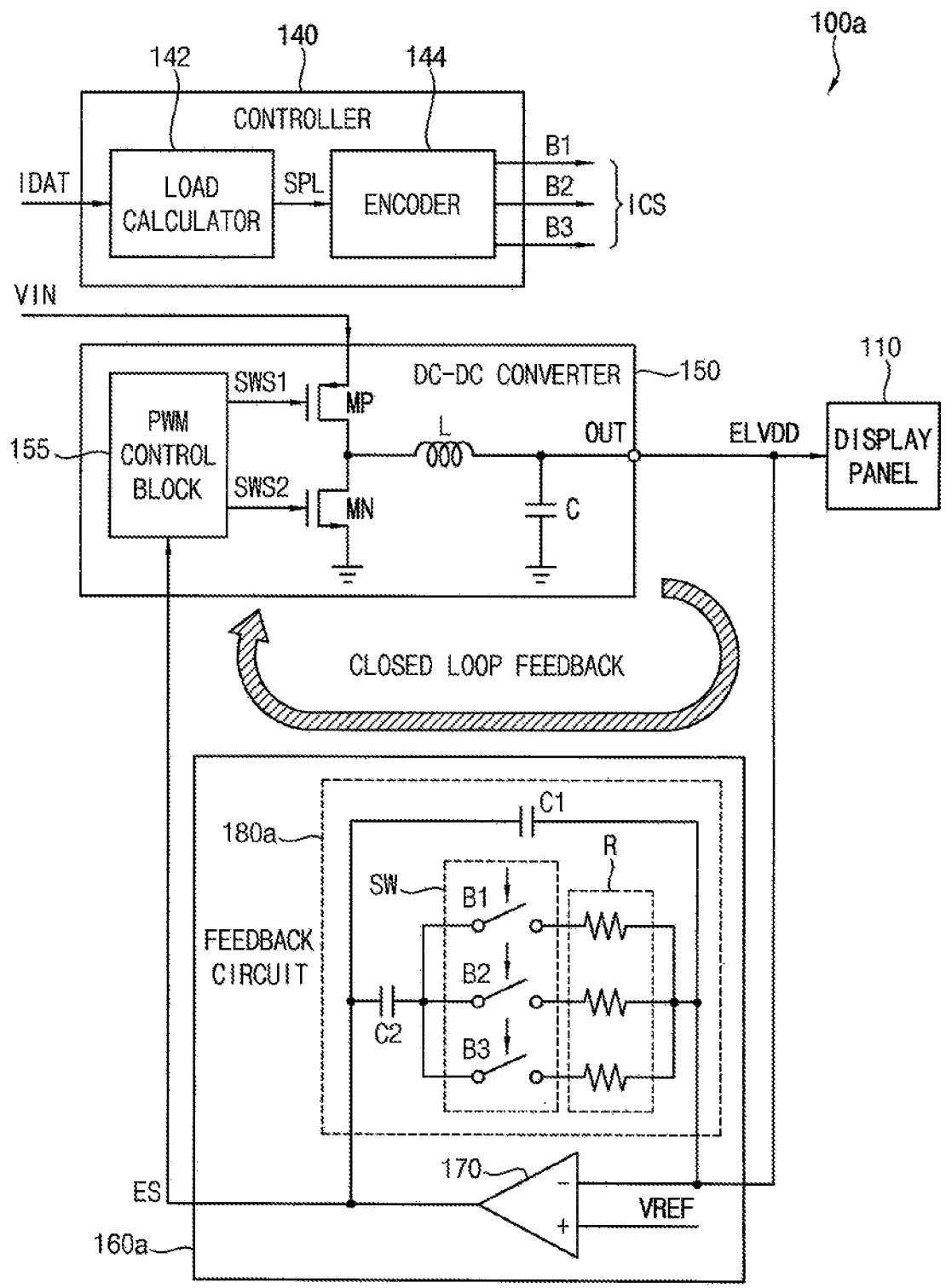
FIG. 3 is a diagram illustrating a display device including a feedback circuit for a power supply voltage according to example embodiments.

FIG. 3 is a diagram illustrating a display device including a feedback circuit for a power supply voltage according to example embodiments.

Referring to FIG. 3, in a display device 100a, a closed loop feedback system for a power supply voltage ELVDD is formed by a DC-DC converter 150 that generates the power supply voltage ELVDD based on input voltage VIN and a feedback circuit 160a that feedbacks the power supply voltage ELVDD supplied to a display panel 110 in a form of an error signal ES to the DC-DC converter 150.

The DC-DC converter 150 includes an inductor L connected to an output terminal OUT at which the power supply voltage ELVDD is output, a capacitor C connected between the output terminal OUT and a line of a ground voltage, a first transistor MP that selectively connects a line of the input voltage VIN to the inductor L in response to a first switching signal SWS1, a second transistor MN that selectively connects the line of the ground voltage to the inductor L in response to a second switching signal SWS2, and a pulse width modulation (PWM) control block 155 that generates the first and second switching signals SWS1 and SWS2 to alternately turn on the first and second transistors MP and MN. The PWM control block 155 may adjust pulse widths or duty cycles of the first and second switching signals SWS1 and SWS2 in response to the error signal ES received from the feedback circuit 160a. For example, when the error signal ES represents that the power supply voltage ELVDD is lower than a reference voltage VREF, the PWM control block 155 may increase the pulse width of the first switching signal SWS1, and may decrease the pulse width of the second switching signal SWS2. Further, when the error signal ES represents that the power supply voltage ELVDD is higher than the reference voltage VREF, the PWM control block 155 may decrease the pulse width of the first switching signal SWS1, and may increase the pulse width of the second switching signal SWS2.

The feedback circuit 160a may include an error amplifier 170 that generates the error signal ES based on a difference between the power supply voltage ELVDD supplied to the display panel 110, i.e., a feedback voltage, and the reference voltage VREF, and an impedance circuit 180a connected between a first input terminal of the error amplifier 170 and an output terminal of the error amplifier 170.

A controller 140 includes a load calculator 142 that calculates a panel load of the display panel 110 based on input image data IDAT to generate a panel load signal SPL representing the calculated panel load, and an encoder 144 that generates an impedance control signal ICS corresponding to the calculated panel load represented by the panel load signal SPL. In some example embodiments, as illustrated in FIG. 3, the impedance control signal ICS may have a plurality of bits B1, B2 and B3. The impedance circuit 180a may receive the impedance control signal ICS generated based on the calculated panel load from the controller 140, and an impedance of the impedance circuit 180a may be adjusted in response to the impedance control signal ICS.

In the display device 100a according to example embodiments, as illustrated in FIG. 3, the error amplifier 170 may include or may be an operational amplifier having a first input terminal receiving the feedback voltage, a second input terminal receiving the reference voltage VREF, and an output terminal outputting the error signal ES. For example, the first input terminal may be an inverting input terminal, and the second input terminal may be a non-inverting input terminal. The reference voltage VREF may have a voltage level that is desired with respect to the power supply voltage ELVDD.

Further, in the display device 100a according to example embodiments, the impedance circuit 180a includes a first capacitor C1 having a first electrode connected to the output terminal of the operational amplifier, and a second electrode connected to the first input terminal of the operational amplifier, a second capacitor C2 having a first electrode connected to the output terminal of the operational amplifier, and a second electrode, and a variable resistor circuit SW and R connected between the second electrode of the second capacitor C2 and the first input terminal of the operational amplifier. The variable resistor circuit SW and R may have a variable resistance that is adjusted in response to the impedance control signal ICS.

In some example embodiments, as illustrated in FIG. 3, the variable resistor circuit SW and R includes a plurality of switches SW that are selectively turned on in response to the impedance control signal ICS, and a plurality of resistors R that are selectively connected between the second electrode of the second capacitor C2 and the first input terminal of the operational amplifier by the plurality of switches SW, respectively. In some example embodiments, the impedance control signal ICS may have the plurality of bits B1, B2 and B3, and the plurality of switches SW may be selectively turned on in response to the plurality of bits B1, B2 and B3 of the impedance control signal ICS, respectively. By the plurality of resistors R that are selectively connected to a feedback loop for the power supply voltage ELVDD by the plurality of selectively turned-on switches SW, a resistance of the impedance circuit 180a may be adjusted, and thus an impedance of the feedback circuit 160a may be adjusted. According to example embodiments, the plurality of resistors R may have substantially the same resistance, or may have different resistances. For example, the plurality of resistors R may have, but is not be limited to, binary-weighted resistances.

In some example embodiments, the resistance of the variable resistor circuit SW and R may be decreased as the panel load increases, and may be increased as the panel load decreases. For example, in a case where the panel load is relatively high, a pole of the closed loop feedback system by the DC-DC converter 150, the display panel 110 and the feedback circuit 160a may be formed in a high frequency region. In this case, the resistance of the variable resistor circuit SW and R may be decreased, and thus a zero of the closed loop feedback system may be formed in the high frequency region. Accordingly, the pole may be compensated by the zero, and thus a stability of the closed loop feedback system may be improved. Further, in a case where the panel load is relatively low, the pole of the closed loop feedback system may be formed in a low frequency region. In this case, the resistance of the variable resistor circuit SW and R may be increased, and thus the zero of the closed loop feedback system may be formed in the low frequency region. Accordingly, the pole may be compensated by the zero, and thus the stability of the closed loop feedback system may be increased. For example, the DC-DC converter 150 may achieve a stable transient operation to a load variation due to change in the input image data.

As described above, in the display device 100a according to example embodiments, even if the panel load of the display panel 110 is changed, the resistance of the impedance circuit 180a may be changed according to the calculated panel load, and thus a transient response characteristic and the stability of the closed loop feedback system may be improved.

Figure 4:
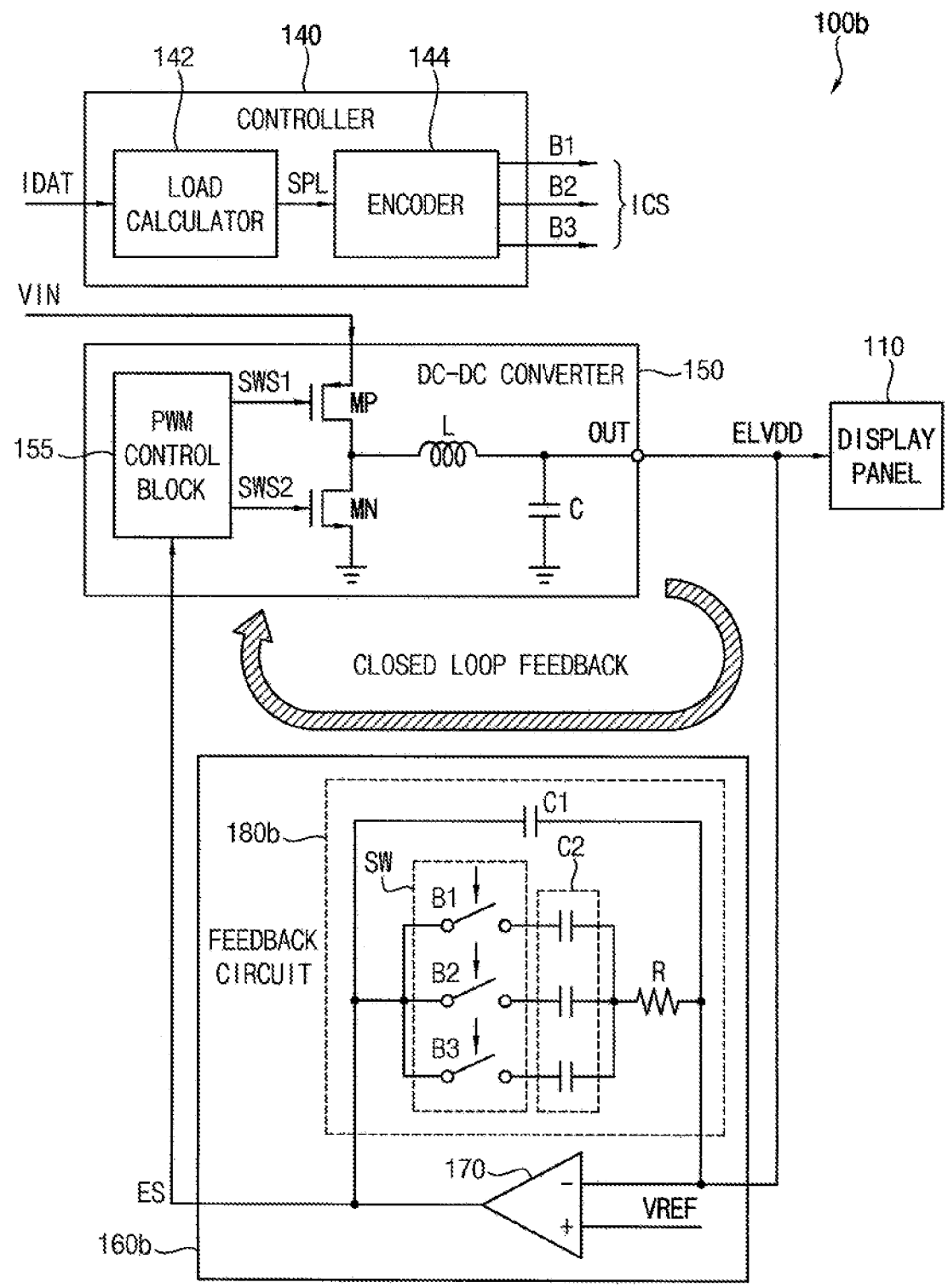
FIG. 4 is a diagram illustrating a display device including a feedback circuit for a power supply voltage according to example embodiments.

FIG. 4 is a diagram illustrating a display device including a feedback circuit for a power supply voltage according to example embodiments.

A display device 100b of FIG. 4 may have a similar configuration and a similar operation to a display device 100a of FIG. 3, except for a configuration of an impedance circuit 180b.

Referring to FIG. 4, in the display device 100b according to example embodiments, the impedance circuit 180b includes a first capacitor C1 having a first electrode connected to an output terminal of an operational amplifier, and a second electrode connected to a first input terminal of the operational amplifier, a resistor R having a first terminal connected to the first input terminal of the operational amplifier, and a second terminal, and a variable capacitor circuit SW and C2 connected between the output terminal of the operational amplifier and the second terminal of the resistor R. The variable capacitor circuit SW and C2 may have a capacitance that is adjusted in response to an impedance control signal ICS. In some example embodiments, the capacitance of the variable capacitor circuit SW and C2 may be increased as a panel load increases.

In some example embodiments, as illustrated in FIG. 4, the variable capacitor circuit SW and C2 includes a plurality of switches SW that are selectively turned on in response to the impedance control signal ICS, and a plurality of second capacitors C2 that are selectively connected between the output terminal of the operational amplifier and the second terminal of the resistor R by the plurality of switches SW, respectively. In some example embodiments, the impedance control signal ICS may have a plurality of bits B1, B2 and B3, and the plurality of switches SW may be selectively turned on in response to the plurality of bits B1, B2 and B3 of the impedance control signal ICS, respectively. By the plurality of second capacitors C2 that are selectively connected to a feedback loop for the power supply voltage ELVDD by the plurality of selectively turned-on switches SW, a capacitance of the impedance circuit 180b may be adjusted, and thus an impedance of the feedback circuit 160b may be adjusted. According to example embodiments, the plurality of second capacitors C2 may have substantially the same capacitance, or may have different capacitances. For example, the plurality of second capacitors C2 may have, but not be limited to, binary-weighted capacitances.

As described above, in the display device 100b according to example embodiments, even if the panel load of a display panel 110 is changed, the capacitance of the impedance circuit 180b may be changed according to the calculated panel load, and thus a transient response characteristic and a stability of a closed loop feedback system may be improved. For example, the DC-DC converter 150 may achieve a stable transient operation such as fast transient time and low output ripple to a load variation, and thus the performance of the DC-DC converter 150 may be improved.

Figure 5:
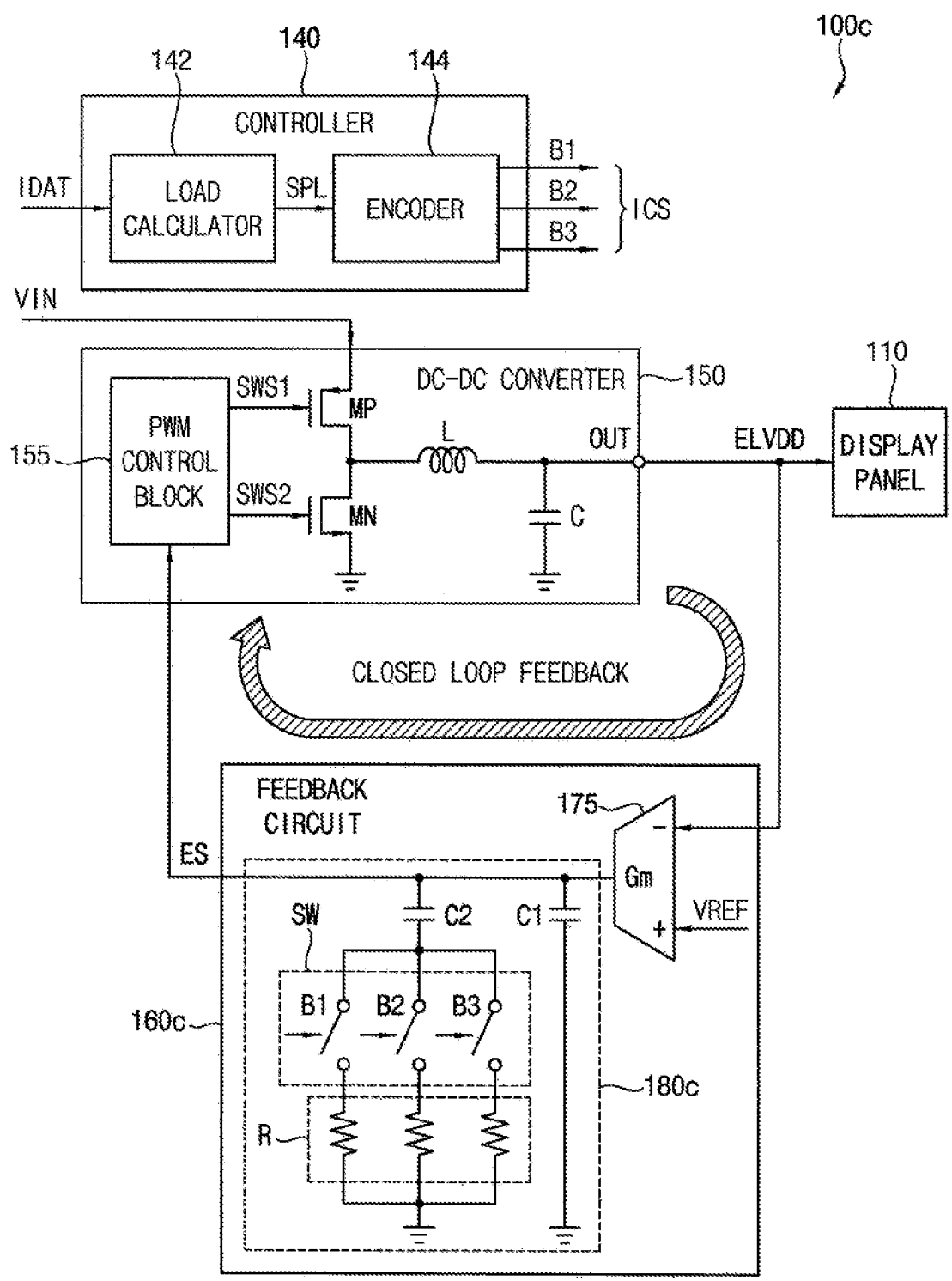
FIG. 5 is a diagram illustrating a display device including a feedback circuit for a power supply voltage according to example embodiments.

FIG. 5 is a diagram illustrating a display device including a feedback circuit for a power supply voltage according to example embodiments.

A display device 100c of FIG. 5 may have a similar configuration and a similar operation to a display device 100a of FIG. 3, except for a configuration of an error amplifier and a connection relationship of an impedance circuit to the error amplifier. In the display device 100c of FIG. 5, the error amplifier may be implemented as a transconductor (or a Gm cell) 175.

Referring to FIG. 5, in the display device 100c according to example embodiments, a feedback circuit 160c includes, as the error amplifier generating an error signal ES corresponding to a difference between a power supply voltage ELVDD, i.e., a feedback voltage, and a reference voltage VREF, a transconductor 175 having a first input terminal (e.g., an inverting input terminal) receiving the feedback voltage, a second input terminal (e.g., a non-inverting input terminal) receiving the reference voltage VREF, and an output terminal outputting the error signal ES.

The feedback circuit 160c further includes, as the impedance circuit 180c connected to the transconductor 175, a first capacitor C1 having a first electrode connected to the output terminal of the transconductor 175, and a second electrode connected to a line of a ground voltage, a second capacitor C2 having a first electrode connected to the output terminal of the transconductor 175, and a second electrode, and a variable resistor circuit SW and R connected between the second electrode of the second capacitor C2 and the line of the ground voltage, and having a resistance that is adjusted in response to an impedance control signal ICS. In some example embodiments, as illustrated in FIG. 5, the variable resistor circuit SW and R includes a plurality of switches SW that are selectively turned on in response to the impedance control signal ICS, and a plurality of resistors R that are selectively connected between the second electrode of the second capacitor C2 and the line of the ground voltage by the plurality of switches SW, respectively.

Figure 6:
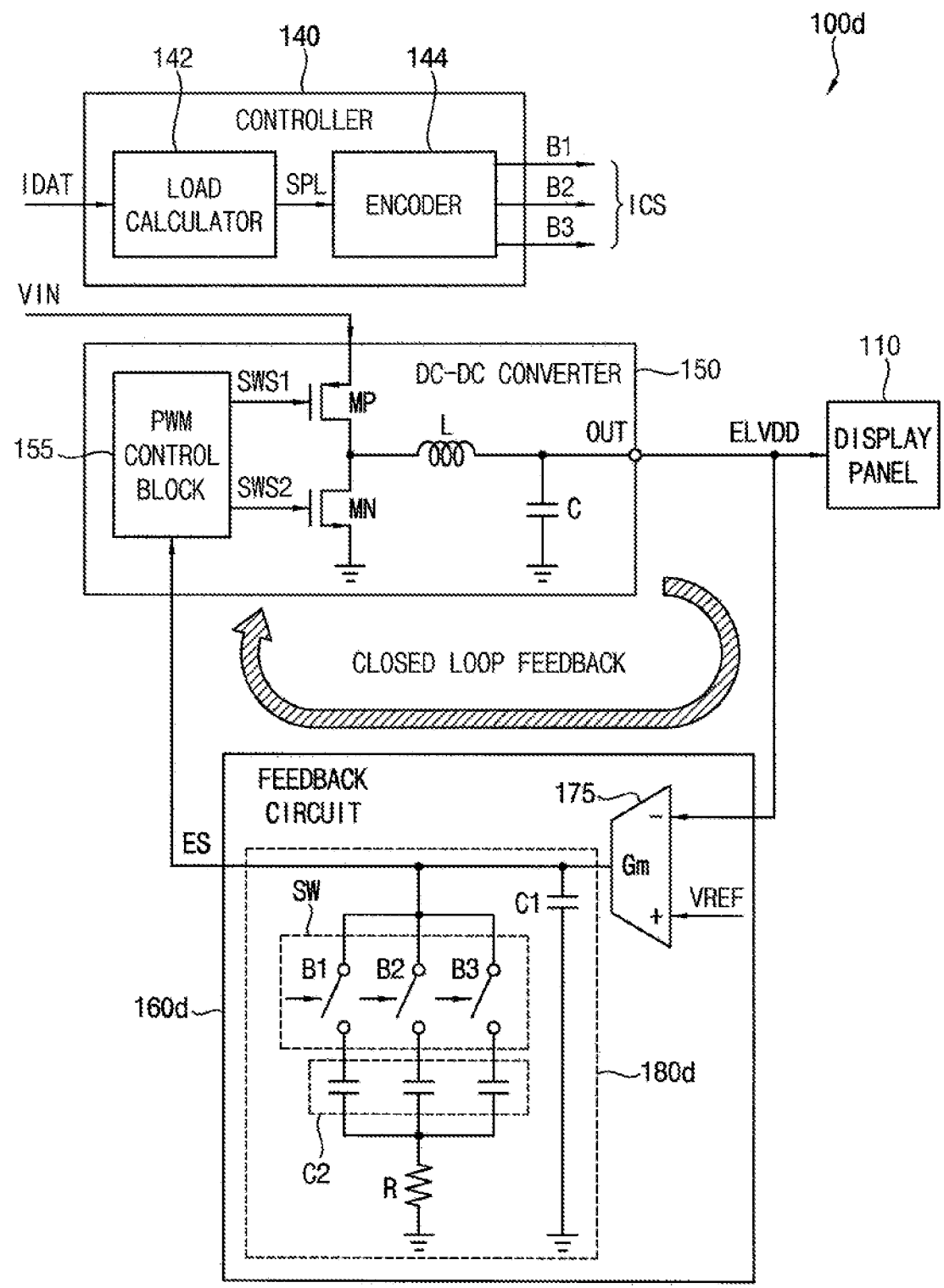
FIG. 6 is a diagram illustrating a display device including a feedback circuit for a power supply voltage according to example embodiments.

FIG. 6 is a diagram illustrating a display device including a feedback circuit for a power supply voltage according to example embodiments.

A display device 100d of FIG. 6 may have a similar configuration and a similar operation to a display device 100b of FIG. 4, except for a configuration of an error amplifier and a connection relationship of an impedance circuit 180d to the error amplifier. In the display device 100d of FIG. 6, the error amplifier may be implemented as a transconductor (or a Gm cell) 175.

Referring to FIG. 6, in the display device 100d according to example embodiments, a feedback circuit 160d includes, as the error amplifier, a transconductor 175 having a first input terminal receiving a feedback voltage, a second input terminal receiving a reference voltage VREF, and an output terminal outputting an error signal ES.

The feedback circuit 160d further includes, as the impedance circuit 180d connected to the transconductor 175, a first capacitor C1 having a first electrode connected to the output terminal of the transconductor 175, and a second electrode connected to a line of a ground voltage, a resistor R having a first terminal connected to the line of the ground voltage, and a second terminal, and a variable capacitor circuit SW and C2 connected between the output terminal of the transconductor 175 and the second terminal of the resistor, and having a capacitance that is adjusted in response to an impedance control signal ICS. In some example embodiments, as illustrated in FIG. 6, the variable capacitor circuit SW and C2 includes a plurality of switches SW that are selectively turned on in response to the impedance control signal ICS, and a plurality of second capacitors C2 that are selectively connected between the output terminal of the transconductor 175 and the second terminal of the resistor R by the plurality of switches SW, respectively.

Figure 7:
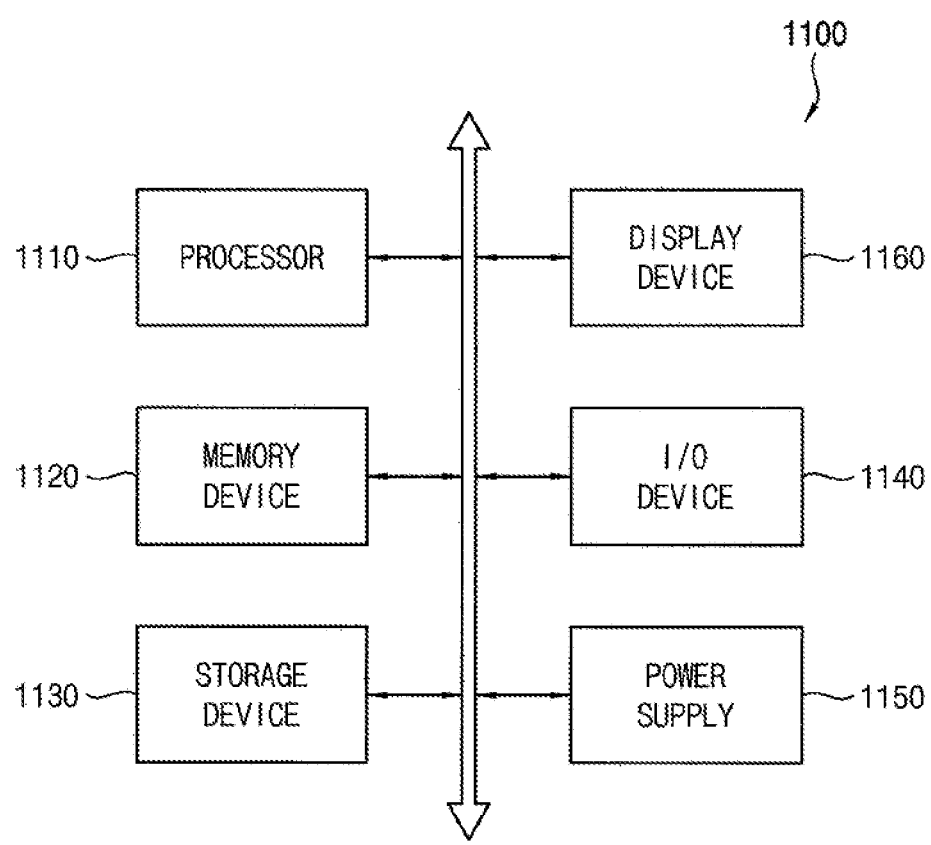
FIG. 7 is a block diagram illustrating an electronic device including a display device according to example embodiments.

FIG. 7 is a block diagram illustrating an electronic device including a display device according to example embodiments.

Referring to FIG. 7, an electronic device 1100 includes a processor 1110, a memory device 1120, a storage device 1130, an input/output (I/O) device 1140, a power supply 1150, and a display device 1160. The electronic device 1100 further includes a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some example embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

The display device 1160 may include a feedback circuit that provides a DC-DC converter with an error signal corresponding to a difference between a power supply voltage generated by the DC-DC converter and supplied to a display panel and a reference voltage, may calculate a panel load based on input image data, and may adjust an impedance of the feedback circuit according to the calculated panel load. Accordingly, a transient response characteristic and a stability of a feedback loop for the power supply voltage may be improved, and a voltage drop caused by a ripple of the power supply voltage and a change of the panel load may be reduced.

The inventive concepts may be applied to any electronic device 1100 including the display device 1160. For example, the inventive concepts may be applied to a mobile phone, a smart phone, a tablet computer, a virtual reality (VR) device, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device comprising:
a display panel including a plurality of pixels;
a data driver configured to provide data signals to the plurality of pixels;
a scan driver configured to provide scan signals to the plurality of pixels;
a DC-DC converter configured to convert an input voltage to a power supply voltage, and to supply the power supply voltage to the display panel;
a feedback circuit having a variable impedance and configured to provide a feedback path of the power supply voltage to the DC-DC converter by receiving the power supply voltage supplied from the DC-DC converter to the display panel as a feedback voltage of the DC-DC converter, and providing an error signal corresponding to a difference between the feedback voltage and a reference voltage to the DC-DC converter; and
a controller configured to control the data driver and the scan driver, to calculate a panel load of the display panel based on input image data, and to adjust the variable impedance of the feedback circuit according to the calculated panel load,
wherein the feedback circuit further includes:
an error amplifier configured to generate the error signal based on the difference between the feedback voltage and the reference voltage; and
an impedance circuit connected to the error amplifier, wherein the impedance circuit is configured to have the variable impedance adjusted in response to an impedance control signal generated based on the calculated panel load from the controller,
wherein the error amplifier includes:
an operational amplifier having a first input terminal receiving the feedback voltage, a second input terminal receiving the reference voltage, and an output terminal outputting the error signal, and
wherein the impedance circuit includes:
a first capacitor having a first electrode connected to the output terminal of the operational amplifier, and a second electrode connected to the first input terminal of the operational amplifier;
a second capacitor having a first electrode connected to the output terminal of the operational amplifier, and a second electrode; and
a variable resistor circuit connected between the second electrode of the second capacitor and the first input terminal of the operational amplifier, and controlled to have a resistance that is adjusted in response to the impedance control signal.

2. The display device of claim 1,
wherein the resistance of the variable resistor circuit is decreased as the panel load increases.

3. The display device of claim 1,
wherein the variable resistor circuit includes:
a plurality of switches connected to the output terminal of the operational amplifier; and
a plurality of resistors connected to the first input terminal of the operational amplifier, and
wherein each of the plurality of switches, in response to the impedance control signal, selectively connects a corresponding resistor of the plurality of resistors to the second electrode of the second capacitor.

4. The display device of claim 1,
wherein the controller includes:
a load calculator configured to calculate the panel load based on the input image data; and
an encoder configured to generate the impedance control signal corresponding to the calculated panel load.

5. The display device of claim 4,
wherein the impedance control signal has a plurality of bits, and
wherein the feedback circuit includes a plurality of switches each of which is controlled by a corresponding one of the plurality of bits to set the variable impedance.

6. A display device comprising:
a display panel including a plurality of pixels;
a data driver configured to provide data signals to the plurality of pixels;
a scan driver configured to provide scan signals to the plurality of pixels;
a DC-DC converter configured to convert an input voltage to a power supply voltage, and to supply the power supply voltage to the display panel;
a feedback circuit having a variable impedance and configured to provide a feedback path of the power supply voltage to the DC-DC converter by receiving the power supply voltage supplied from the DC-DC converter to the display panel as a feedback voltage of the DC-DC converter, and providing an error signal corresponding to a difference between the feedback voltage and a reference voltage to the DC-DC converter, and
a controller configured to control the data driver and the scan driver, to calculate a panel load of the display panel based on input image data, and to adjust the variable impedance of the feedback circuit according to the calculated panel load,
wherein the DC-DC converter includes:
an inductor connected to an output terminal at which the power supply voltage is output;
a capacitor connected between the output terminal and a line of a ground voltage;
a first transistor configured to selectively connect a line of the input voltage to the inductor in response to a first switching signal;
a second transistor configured to selectively connect the line of the ground voltage to the inductor in response to a second switching signal; and a pulse width modulation control block configured to generate the first and second switching signals, and to adjust duty cycles of the first and second switching signals in response to the error signal.

7. A display device comprising:

a display panel including a plurality of pixels;

a data driver configured to provide data signals to the plurality of pixels;

a scan driver configured to provide scan signals to the plurality of pixels;

a DC-DC converter configured to convert an input voltage into a power supply voltage, and to supply the power supply voltage to the display panel;

a controller configured to control the data driver and the scan driver, to calculate a panel load of the display panel based on input image data, and to generate an impedance control signal based on the calculated panel load;

an error amplifier including a first input terminal receiving the power supply voltage supplied to the display panel as a feedback voltage of the DC-DC converter, a second input terminal receiving a reference voltage, and an output terminal providing an error signal to the DC-DC converter, wherein the error amplifier is configured to generate the error signal corresponding to a difference between the feedback voltage and the reference voltage; and an impedance circuit connected to the output terminal of the error amplifier and the first input terminal thereof, and controlled, in response to the impedance control signal, to have a variable impedance, wherein the impedance circuit includes at least one switch that is selectively turned on in response to the impedance control signal so that at least one resistor that is selected as part of the variable impedance, wherein the error amplifier includes an operational amplifier having the first input terminal receiving the feedback voltage, the second input terminal receiving the reference voltage, and the output terminal outputting the error signal, wherein the impedance circuit further includes:

a first capacitor having a first electrode connected to the output terminal of the operational amplifier, and a second electrode connected to the first input terminal of the operational amplifier;

a second capacitor having a first electrode connected to the output terminal of the operational amplifier, and a second electrode;

a plurality of switches connected to the second electrode of the second capacitor; and a plurality of resistors connected to the first input terminal of the operational amplifier, and wherein each of the plurality of switches, in response to the impedance control signal, selectively connects a corresponding one of the plurality of resistors to the second electrode of the second capacitor.

* * * * *